Patented Mar. 2, 1937

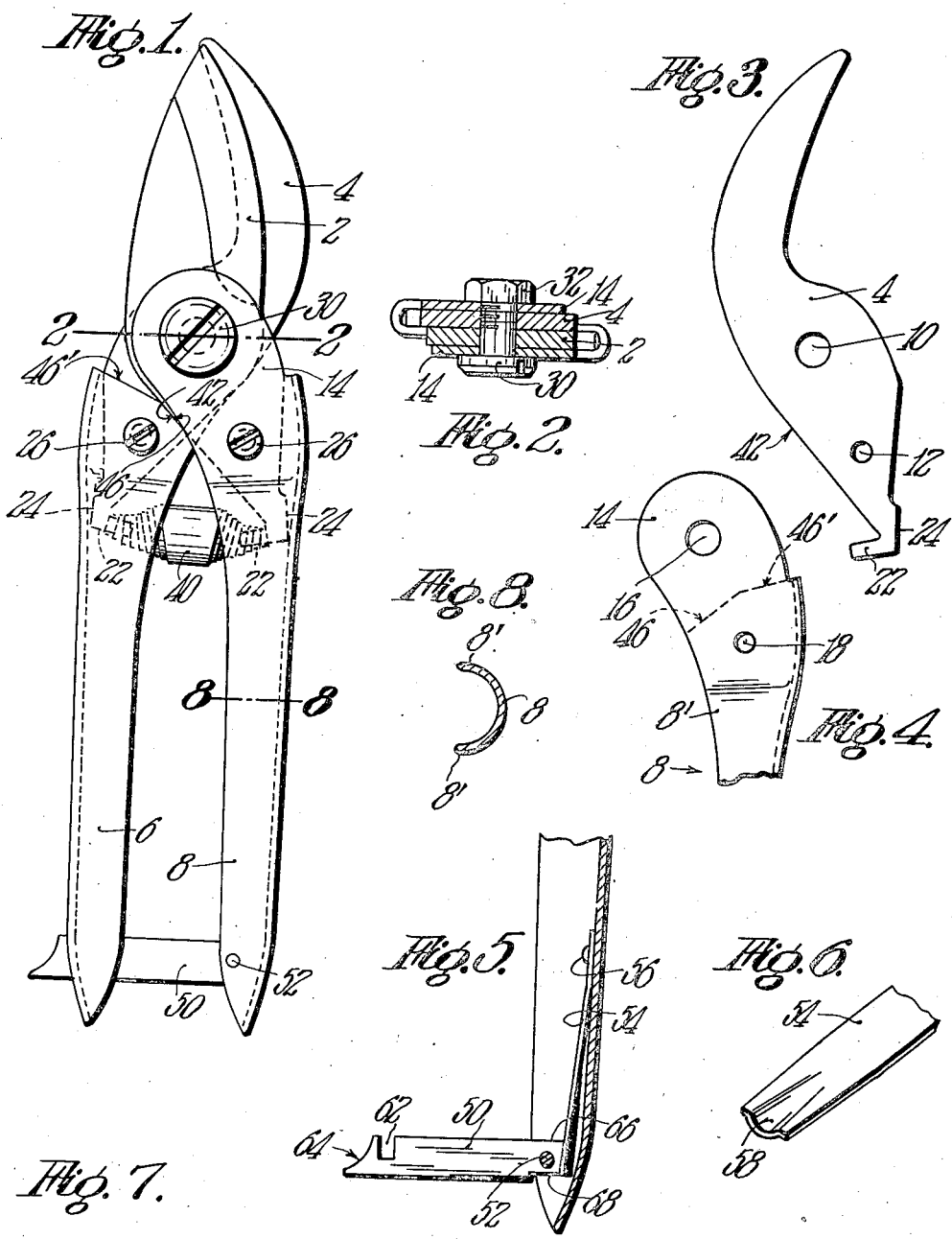

2,072,140

UNITED STATES PATENT OFFICE 2,072,140

CUTTER

Justin L. Smith, Watertown, Conn., assignor to Seymour Smith & Son, Inc., Oakville, Conn., a corporation of Connecticut Application December 15, 1934, Serial No. 757,667

3 Claims. (Cl. 30—11)

This invention relates to improvements in tools and is directed more particularly to improvements in tools having coacting cutters or shears.

One object of the invention is the provision of a cutting tool which consists of relatively few parts arranged in a novel manner to provide a tool which is simple in form, to facilitate economy in manufacture, as well as efficiency in operation.

Another object of the invention is the provision of a tool having coacting shear members which are separably associated with handles all to the end that the ready and easy assembling and disassembling of the tool is facilitated for sharpening or replacing the shearing members, thus obviating the necessity of discarding the whole tool or more than that part thereof which may require replacement.

A further object of the invention is the provision of means associated with the handle members to facilitate automatically releasably locking of the handles with the blade members in closed position. The releasing is easily and readily accomplished while at the same time the locking means is not only automatically operative when the handles are closed to a certain position but the locking means is arranged so that it may be disposed in non-locking position.

A still further object of the invention is the provision of a tool of the class referred to which is so constructed and arranged that at the pivotal connection of the relatively swinging parts there is a minimum number of thicknesses of material. This not only facilitates economy in manufacture but provides a tool which is light in weight and yet strong and rugged without being unnecessarily cumbersome.

The above and numerous other novel objects and advantages of the invention will be hereafter more fully referred to in connection with the accompanying description of the invention in the form at present preferred, reference being had to the accompanying drawing wherein:

Fig. 1 is a side elevational view of a shearing tool embodying the novel features of the invention;

Fig. 2 is a sectional plan view on the line 2—2 of Fig. 1;

Fig. 3 is a side elevational view of one of the shear members of the tool shown in Fig. 1;

Fig. 4 is a side elevational view of the upper part of one of the handle members of the shear shown in Figs. 1 and 2;

Fig. 5 is a longitudinal sectional elevational view through the lower part of one of the handle members to explain certain details of construction pertaining to the releasable locking latch mechanism;

Fig. 6 is an enlarged partial perspective elevational view showing a spring member associated with the latch mechanism;

Fig. 7 is an end elevational view of the lower end portion of one of the handle members; and Fig. 8 is a sectional plan view on the line 8—8 of Fig. 1.

Referring now to the drawing more in detail the invention will be fully described.

In a general way the shear includes co-acting shear members, such as a cutter blade 2 and a hook blade member 4, and handle members 6 and 8. These, of course, may take various forms or shapes as may be desired without departing from the spirit and scope of the invention.

The handles 6 and 8 are preferably channel shaped as shown in Fig. 8 and have what may be called side legs or walls such as 8'. The hook blade 4 and cutter blade 2 are each associated with their respective handles 6 and 8 to provide assemblies, each consisting of a blade and handle, which are pivoted together for relative swinging movements. The blades are associated with their accompanying handles after the following manner.

The blades 2 and 4 have a pivot opening, such as the opening 10 shown in connection with the hook blade in Fig. 3, and other openings such as 12, for clamp bolts. The wall or leg members of the handles are spaced apart near the upper ends of the handles so as to snugly receive therebetween the blade members as shown in Figs. 1 and 2. One leg member of each handle extends above and beyond the other leg member so that there is formed a lug or ear such as 14 for each handle.

Openings such as 16 are provided in the lugs or ears 14 which may be called pivot openings and the walls or legs of each handle therebelow have other openings such as 18 for receiving clamp bolts or screws. The pivot openings of the blades such as the openings or holes 10 are adapted to register with the openings such as 16 of the ears 14 of the handles 2 and 4 while the openings 12 of the blades register with openings 18 in the walls or legs of the handles.

The blade members 2 and 4 have their lower portions inserted between the legs of the handles and screws or bolts such as 26 pass through the holes 12 and 18 of the blades and handles. By tightening the bolts or screws 26 the blades are suitably secured to their respective handles. A pivot bolt or screw such as 30 extends through an opening 16 in the ear 14 of one handle, through the opening 10 of the blade associated therewith, then through the opening 10 of the adjacent blade and through the opening 16 of the ear 14 of the handle associated with the latter blade.

This bolt 30 may be threaded in the outermost blade member such as 4, if desired. A nut 32 is preferably provided on the outer end of bolt 30 and this may be suitably adjusted to facilitate the desired relative swinging movements of the blade members.

With the construction described the rear or outer side edges of the lower portions of the blades do not necessarily bottom against the outer wall of the handles but, of course, these, as well as the outermost edges of the blades indicated by 24, may abut the handles if desired. As shown in Fig. 1, the blades 2 and 4 swing on the pivot bolt 30 while each handle has one ear thereof fulcrumed on the said bolt with the lower end of each blade secured to its respective handle by means of the screws or bolts 26.

The bolts 26 secure the blades to the handles in such a way that the structure is capable of withstanding lateral strains or twisting and it is not necessary to extend both sides of each handle to receive the pivot bolt.

When the handles are swung towards one another on the pivot bolt they actuate the blade members through the connections between the handles and blades such as the bolts or screws 26. Not only are the associated blades and handles readily and easily assembled and disassembled but the construction facilitates economical manufacture while at the same time the handles are adapted to efficiently actuate the blades.

It will be noticed that aside from the superposed blade members at the pivot bolt there are only two other thicknesses of metal, these being one ear only of each of the handles. Therefore, the tool at the joint, so-called, is relatively thin and, because the blades are associated with and actuated by the handles after the manner described, the construction is rugged.

A compression spring indicated by 40 receives ears such as 22 of the blades and, of course, not only normally tends to resist closing of the blades and handles but causes the handles and blades to separate when not restrained. Each of the blades has a shoulder 42 on its inner and lower edge while the ends of the shorter side walls of the handles are provided with shoulders such as 46 and 46'.

These shoulders are arranged so that a shoulder 46 of one handle is engageable with the shoulder 42 of the blade associated with the other handle and when brought into abutment they limit the closing movements of the handles and blades as shown in Fig. 1. The shoulders 46' associated with the handles abut the edges of the blades associated with the other handle and limit movements of the handles and blades in their open position.

In the normal operation of the shears the handles are embraced between the fingers of the hand and opened and closed for the shearing function and it is desired, according to this invention, to provide means whereby the shears may be automatically locked in closed relation and yet so locked as to be readily released.

To this end a latch member 50 is pivoted on a pin 52 extending between the legs of one of the handles such as 8. A flat spring 54 has its upper end secured to the handle 8 as by a rivet 56 or the like as shown and its lower or outer end is provided with a groove or seat indicated by 58 as shown in Fig. 6. The other handle 6 is provided with a latch receiving slot 60 and the latch 50 has a slot 62 in its outer end engageable therewith while the outermost end of the latch is provided with a cam face 64. The innermost edge of the latch is preferably more or less flat or straight as are its innermost upper and lower edges 66 and 68. The said innermost end and upper and lower edges of the latch are receivable in the seat 58 of the spring which yieldingly holds the latch in its locking and non-locking positions. Also, the spring holds the latch against movements axially of pin 52.

The latch in Figs. 1 and 5 is shown in locking position, with its rear end seated in the groove 58 of the spring 54 which releasably holds the latch in this locking position. With the tool embraced by the hand it is an easy matter to bring the outer end of the latch up against an object to move it downwardly whereby the handle 6 is released and then the handles are under the separating influence of the spring 40. The latch may be moved either upwardly or downwardly from the locking position shown in Fig. 5 to an unlocking position. In either of these positions the upper or lower edges 66 or 68 rest in the seat 58 of the spring whereby the latch is yieldingly held in the unlocked position to which it is moved.

When desired, the latch may be positioned in its locking position shown in Fig. 5, in which case when the handles are moved towards one another for locking them the outer end of the latch is depressed to swing the latch against the action of the spring by the cam surface 64 thereof bringing up against the upper side of the slot 60 in the handle 6. The wall of the handle above the slot is received in the said slot of the latch. Thus the handles are automatically locked but they may be readily released by merely tripping the latch which may assume a locking position or be moved to an unlocking position, in which latter position the latch is yieldingly held.

It will be noted that the tool, as a special feature, has coacting blades associated with a handle in such a way as to facilitate ready and easy assembling and disassembling of the parts while the number of thicknesses of material at the pivotal joint is reduced to a minimum without impairing the rigidity and ruggedness of construction.

The locking means renders the tool easy of manipulation since the latch may be set to automatically lock the handles and yet is readily releasable, while if desired, the latch may be yieldingly held in a non-locking position.

While I have described my invention in great detail and with respect to a preferred form thereof, it is not desired to be limited thereto since many changes and modifications may be made therein without departing from the spirit and scope of the invention. What it is desired to claim and secure by Letters Patent of the United States is:

1. A tool of the class described, a pair of handles having spaced side walls at their upper ends, blade members having inner portions rigidly secured between said walls of the handles and outer working portions provided with substantially flat inner faces and rear edges, each of said handles having the one of its said walls which is adjacent the outer side face of the blade member secured thereto extending outwardly beyond the plane of the upper marginal edge of the other of its walls to provide an ear on one side of the handle and a shoulder on the other side thereof, and a pivot pin extending through said blade members and the ears of said handles outwardly beyond the plane of said shoulders to permit swinging of the same between open and closed positions, all adapted and arranged whereby said handles and blade members may be swung between a closed position wherein said inner faces of the blade members are substantially contiguous and an open position wherein the rear edge of one of the blade members is in engagement with the shoulder of the other handle whereby the swinging movement of the handles to an open position is limited.

2. A tool of the class described, a pair of handles having spaced side walls at their upper ends, blade members having inner portions rigidly secured between said walls of the handles and outer working portions provided with substantially flat inner faces, the inner edges of said outer working portions constituting co-operating working edges, each of said handles having the one of its said walls which is adjacent the outer side face of the blade member which is secured thereto extending outwardly beyond the plane of the upper marginal edge of the other of its walls to provide ears adjacent the outer side faces of said blade members, and a pivot pin extending through said ears and blade members to permit relative swinging of the same between open and closed positions, the upper marginal edge of said other wall of one of the handles being formed to provide a shoulder against which the rear edge of the blade member which is secured to the other handle may abut whereby the swinging movement of the handles to an open position is limited.

3. A tool of the class described comprising in combination, a pair of blade-carrying handles pivoted for swinging between unlocked and locked positions, one of said handles being formed to have spaced side walls with the inner faces thereof a certain distance apart, a stationary pin extending between said inner faces of the side walls of said one handle, a substantially flat spring member having one end portion rigidly secured to said one handle and an opposite end portion disposed freely behind said pin, a longitudinally-extending latch member having a rear end part pivoted on said pin and arranged to swing between locking and non-locking positions, and releasable engaging means associated with the forward end part of said latch member and the other handle for releasably locking the handles in locked position when the latch member is in said locking position, said rear end part of the latch member being of less width than the said certain distance between the inner faces of the side walls whereby the latch member is slidable on said pin, said free end portion of the spring member being provided with a depression therein and said rear end part of the latch member being provided with angularly disposed edges engageable with said depression, all adapted and arranged whereby said depression holds said latch member against movements axially of said pin and the latch member may be swung on said pin between locking or non-locking positions so as to bring the said releasable engaging means of the said other handle and the said latch member into engagement.

JUSTIN L. SMITH.